United States Patent [19]

Ewbank et al.

[11] Patent Number: 4,739,795

[45] Date of Patent: Apr. 26, 1988

[54] FLOW CONTROL VALVE

[75] Inventors: Michael E. Ewbank; Steven A. Heitz, both of Rockford, Ill.

[73] Assignee: Sundstrand Corporation, Rockford, Ill.

[21] Appl. No.: 886,872

[22] Filed: Jul. 18, 1986

[51] Int. Cl.4 ............................................ F16K 31/38
[52] U.S. Cl. ................................ 137/625.38; 138/42; 251/43; 251/127
[58] Field of Search ............... 137/625.39, 625.38; 251/127, 43, 118; 138/43, 42; 251/41

[56] References Cited

U.S. PATENT DOCUMENTS

| | | |
|---|---|---|
| 344,724 | 6/1886 | Crosby . |
| 462,823 | 11/1891 | Phillipson . |
| 971,934 | 10/1910 | Siegrist ............................ 251/41 X |
| 977,427 | 12/1910 | Armstrong . |
| 1,004,650 | 10/1911 | Hilton ............................ 251/43 X |
| 1,224,221 | 5/1917 | Schwanebeck . |
| 1,818,258 | 8/1931 | Isaacks . |
| 1,852,164 | 4/1932 | Holzwarth . |
| 1,868,708 | 7/1932 | Hunt . |
| 1,947,586 | 2/1934 | Fletcher . |
| 2,050,430 | 8/1936 | Erickson ........................... 251/43 X |
| 2,132,854 | 10/1938 | Knott . |
| 2,297,817 | 10/1942 | Truxell, Jr. . |
| 2,576,610 | 11/1951 | Kunzog . |
| 2,668,035 | 2/1954 | Trevaskis . |
| 2,722,942 | 11/1955 | Hencken . |
| 2,748,802 | 6/1956 | Hanson et al. . |
| 2,775,486 | 12/1956 | King . |
| 2,856,962 | 10/1958 | Christoph . |
| 2,857,927 | 10/1958 | Pardee . |
| 2,887,129 | 5/1959 | Stear . |
| 2,918,087 | 12/1959 | Curran . |
| 3,042,078 | 7/1962 | Rosell . |
| 3,112,764 | 12/1963 | Anderson et al. . |
| 3,157,200 | 11/1964 | Rowan . |
| 3,253,401 | 5/1966 | Wells . |
| 3,376,793 | 4/1968 | Papadia et al. ................... 251/41 X |
| 3,439,659 | 4/1969 | Bouwkamp . |
| 3,514,074 | 5/1970 | Self . |
| 3,529,628 | 9/1970 | Cummins . |
| 3,602,261 | 8/1971 | Brown et al. . |
| 3,631,891 | 1/1972 | Brumm . |
| 3,645,298 | 2/1972 | Roberts et al. . |
| 3,693,659 | 9/1972 | Parola . |
| 3,722,854 | 3/1973 | Parola . |
| 3,744,762 | 7/1973 | Schlicht . |
| 3,771,554 | 11/1973 | Hassall . |
| 3,780,767 | 12/1973 | Borg et al. . |
| 3,789,880 | 2/1974 | Armstrong et al. . |
| 3,813,079 | 5/1974 | Baumann et al. . |
| 3,821,968 | 7/1974 | Barb . |
| 3,826,281 | 7/1974 | Clark . |
| 3,893,927 | 8/1975 | Cronfel . |
| 3,917,221 | 11/1975 | Kubota et al. . |

(List continued on next page.)

FOREIGN PATENT DOCUMENTS

| | | |
|---|---|---|
| 2439583 | 3/1975 | Fed. Rep. of Germany ...... 251/127 |
| 1650409 | 10/1979 | Fed. Rep. of Germany . |
| 350716 | 6/1931 | United Kingdom . |

Primary Examiner—Martin P. Schwadron
Assistant Examiner—Stephen M. Hepperle
Attorney, Agent, or Firm—Wood, Dalton, Phillips, Mason & Rowe

[57] ABSTRACT

In order to provide a control valve for reducing the pressure of a fluid flowing through a system, while also achieving the pressure reduction in an acoustically damped manner, the flow control valve utilizes a pressure reduction chamber for reducing fluid pressure in an incremental manner together with a valve member having a porous insert for acoustically damping noise generated during the pressure reduction. The flow control valve includes a valve housing having a valve chamber intermediate a fluid inlet and a fluid outlet through which the fluid inlet communicates with the fluid outlet. By utilizing these components in the valve, the pressure reduction chamber can be disposed generally intermediate the fluid inlet and valve chamber, and the hollow valve member can be disposed in communication with the pressure reduction chamber, whereby the porous insert in the hollow valve member will further reduce fluid pressure in an acoustically damped manner upstream of the fluid outlet.

13 Claims, 1 Drawing Sheet

U.S. PATENT DOCUMENTS

| | | |
|---|---|---|
| 3,917,222 | 11/1975 | Kay et al. |
| 4,024,891 | 5/1977 | Engle et al. ............ 138/43 X |
| 4,041,982 | 8/1977 | Lindner ............ 138/43 X |
| 4,083,380 | 4/1978 | Huber. |
| 4,103,702 | 8/1978 | Duthion et al. |
| 4,106,525 | 8/1978 | Currie et al. ............ 138/43 |
| 4,108,210 | 8/1978 | Luthe et al. |
| 4,249,574 | 2/1981 | Schnall et al. |
| 4,352,373 | 10/1982 | Kay et al. |
| 4,398,563 | 8/1983 | Kay et al. |
| 4,407,327 | 10/1983 | Hanson et al. |

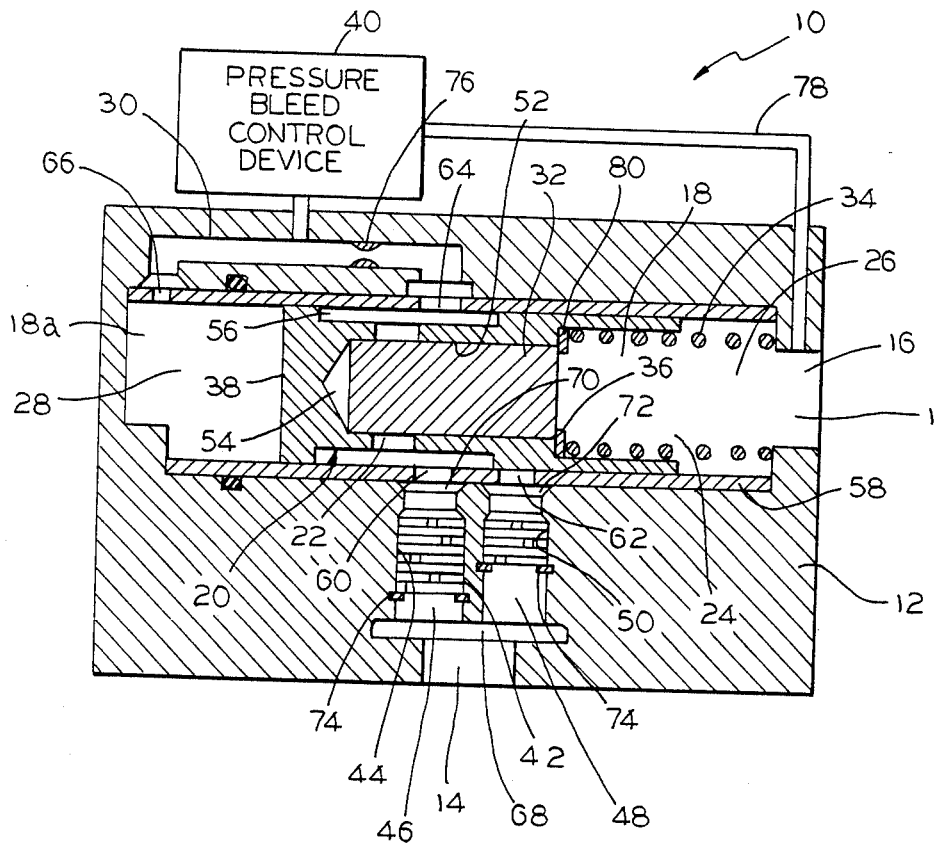
FIG.1
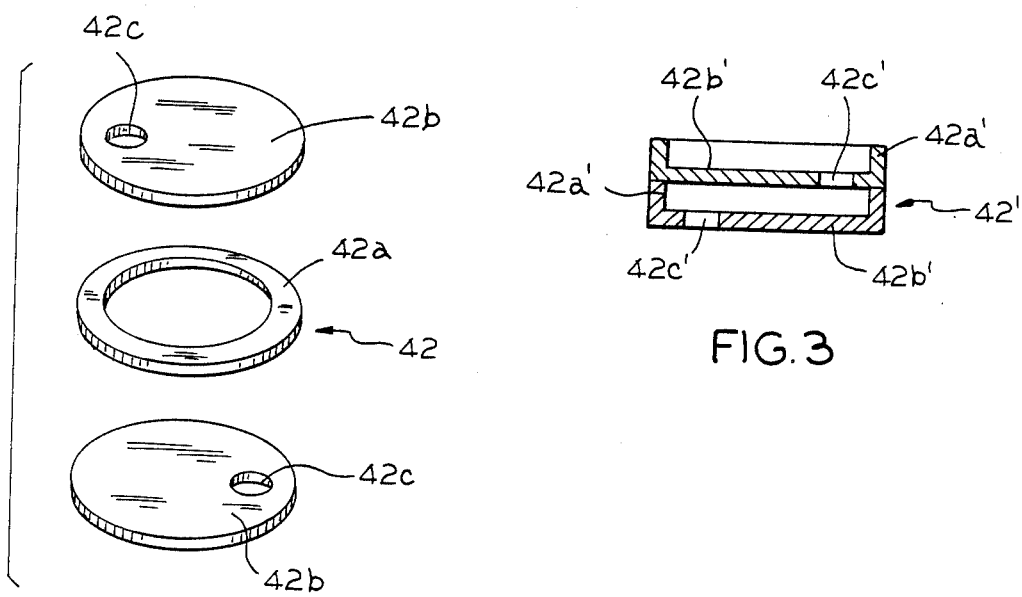
FIG.2
FIG.3

FLOW CONTROL VALVE

FIELD OF THE INVENTION

The present invention relates to flow control valves and, more particularly, to a valve for controlling fluid flow in a noise reducing manner.

BACKGROUND OF THE INVENTION

Generally, it is recognized that valves are useful for controlling the pressure of a fluid in a system. This is usually accomplished by providing means within the valve for reducing fluid pressure between the inlet and outlet sides thereof. However, such pressure reduction can generate an objectionable level of noise from the valve.

When reducing the pressure of a fluid in a system, noise may typically be generated by choking of the valve. Depending upon the environment in which the valve is used, the generation of such noise may be harmful to those persons exposed to it in terms of possible damage to their hearing and reductions in their work efficiency, but also such noise can have an adverse effect such as structural fatique and/or equipment malfunction relative to the system in which the valve is utilized. For instance, in industrial applications, noise generation from pressure reduction is clearly undesirable.

However, noise generation can be a critical problem in military applications. This is particularly true in high technology under water propulsion systems such as those used in torpedoes, submarines and the like. For such applications, a compact, quiet flow control valve having variable gain characteristics would be highly desirable.

When providing a flow control valve for military applications, it is also recognized that the valve should be reliable and effective. It is, therefore, essential not only that the valve reduce noise to a minimum, but also that it be relatively simple in construction so that the degree of pressure reduction can be achieved without multiple complex moving parts. While these requirements are known, it has remained to provide a highly effective variable gain valve having reduced noise generation characteristics.

Among the efforts to provide a silent operating valve is that disclosed in Parola U.S. Pat. No. 3,693,659, issued Sept. 26, 1972. Parola discloses a valve in which a concentrically positioned sleeve has openings therethrough which permits passage of fluid from an inner chamber through an annular porous member to an outlet by means of an axially movable inlet valve member positioned within the sleeve. However, Parola accomplishes the pressure drop primarily across the annular porous member rather than in an incrementally reduced manner.

An attempt to provide a porous element in a reciprocating member is disclosed in Huber U.S. Pat. No. 4,083,380, issued Apr. 11, 1978. It has also been proposed to utilize a porous metal disk contained within a spool to control flow between two outlets as disclosed in Armstrong et al U.S. Pat. No. 3,789,880, issued Feb. 5, 1974. Also, an attempt to provide stacked orifice plates in a fluid inlet of a pressure reducing valve is disclosed in Armstrong U.S. Pat. No. 977,427, issued Dec. 6, 1910.

Among other attempts to provide a flow control valve are those disclosed in U.S. Pat. Nos. 3,893,927; 3,631,891; 3,042,078; 2,918,087; 1,868,708; 1,224,221; and 462,823.

The present invention is directed to overcoming the above stated problems and accomplishing the stated objects.

SUMMARY OF THE INVENTION

It is the principal object of the present invention to provide a new and improved flow control valve. More specifically, it is an object of the invention to provide a valve for controlling fluid flow in a manner reducing noise. It is likewise an object of the invention to provide a variable gain valve for controlling fluid flow in a noise reducing manner.

An exemplary embodiment of the invention achieves the foregoing objects in a flow control valve having a valve housing with a valve chamber intermediate a fluid inlet and a fluid outlet through which fluid flows in a controlled manner. Means are provided intermediate the fluid inlet and valve chamber for reducing fluid pressure in an incremental manner. In addition, a hollow valve member which is disposed in the valve chamber for reciprocating movement, is in communication with the fluid inlet through the incremental pressure reducing means and includes means for further reducing fluid pressure in an acoustically damping manner upstream of the fluid outlet. Means are also provided for controlling pressure at the fluid outlet by controlling the position of the valve member. Moreover, the valve preferably further includes an upstream opening in the hollow valve member in communication with the incremental pressure reducing means and a downstream opening in the hollow valve member in communication with the fluid outlet.

With this construction, the further pressure reducing means preferably includes a porous insert disposed intermediate the openings in the hollow valve member adapted for damping noise upstream of the fluid outlet. The porous insert is such that fluid from the incremental pressure reducing means passes through the porous insert before reaching the fluid outlet. Moreover, the hollow valve member is preferably disposed intermediate opposing ends of the valve chamber to divide the valve chamber into an outlet chamber portion adjacent the fluid outlet and a pressure sensing chamber portion remote from the fluid outlet.

In the exemplary embodiment, means are provided for biasing the hollow valve member in a direction away from the fluid outlet. Further, a pressure sensing line is provided in direct communication with the upstream opening in the hollow valve member and in communication with the pressure sensing portion of the valve chamber through a pressure control device to convey a pressure signal to the pressure sensing chamber portion to act on the hollow valve member in opposition to the biasing means. With this arrangement, the biasing means and pressure signal comprise the means for controlling the position of the valve member.

Still other details of the exemplary embodiment include the valve chamber having a smooth, generally cylindrical, axially extending insert adapted to carry the hollow valve member. It is also advantageous for the hollow valve member to include a solid valve surface facing the pressure sensing chamber portion of the valve chamber and to include an annular surface surrounding the porous insert and facing the outlet chamber portion. Moreover, the biasing means preferably comprises a coil spring disposed between the annular surface of the hollow valve member and the end of the valve chamber adjacent the fluid outlet.

In addition, the flow control valve preferably includes a fluid passageway having a pressure reduction chamber upstream of the valve chamber The pressure reduction chamber includes a plurality of stacked orifice plates selected to provide a preselected drop in fluid pressure between the fluid inlet and the valve chamber. With this arrangement, the stacked orifice plates comprise the incremental pressure reducing means.

In the preferred embodiment of the invention, a second fluid passageway having a second pressure reduction chamber is provided upstream of the valve chamber. The second pressure reduction chamber also includes a plurality of stacked orifice plates selected to provide a drop in fluid pressure between the fluid inlet and the valve chamber. Again, the stacked orifice plates comprise the incremental pressure reducing means associated with the second pressure reduction chamber.

Preferably, the hollow valve member has an opening adapted for communication with one or both of the pressure reduction chambers. The opening is adapted to receive fluid from the fluid inlet after incremental reduction of the pressure thereof by the stacked orifice plates. Moreover, the pressure controlling means is adapted to position the opening in the hollow valve member in communication with one or both of the pressure reduction chambers.

Other objects, advantages and features will become apparent from the following specification taken in conjunction with the accompanying drawings.

BRIEF DESCRIPTION OF THE DRAWINGS

In the drawings:

FIG. 1 is a cross sectional view of a flow control valve in accordance with the present invention;

FIG. 2 is an exploded perspective view of one form of stacked orifice plates for the flow control valve of FIG. 1; and FIG. 3 is a cross sectional view of another form of stacked orifice plates for the flow control valve of FIG. 1.

DETAILED DESCRIPTION OF THE PREFERRED EMBODIMENTS

An exemplary embodiment of a flow control valve in accordance with the invention is illustrated in FIG. 1. The flow control valve 10 includes a valve housing 12 having a fluid inlet 14 and a fluid outlet 16. A valve chamber 18 is provided intermediate the fluid inlet 14 and the fluid outlet 16, and the fluid inlet 14 communicates with the fluid outlet 16 through the valve chamber 18. A hollow valve member 20 is provided in the valve chamber 18 for reciprocating movement therewithin, and the hollow valve member 20 is in communication with the fluid inlet 14 through means for reducing fluid pressure in an incremental manner (as will be described in detail hereinafter). The flow control valve 10 also includes an upstream opening 22 and a downstream opening 24 in the hollow valve member 20. Moreover, the hollow valve member 20 includes means for further reducing fluid pressure in an acoustically damping manner upstream of the fluid outlet 16 (as will be described in detail hereinafter).

By referring to FIG. 1, it will be appreciated that the hollow valve member 20 is disposed generally intermediate opposing ends 18a and 18b of the valve chamber 18. The hollow valve member 20 divides the valve chamber 18 into an outlet chamber portion 26 adjacent the fluid outlet 16 and a pressure sensing chamber portion 28 remote from the fluid outlet 16. Also, as shown, a pressure sensing line 30 is in direct communication with the upstream opening 22 in the hollow valve member 20 and is in direct communication with the pressure sensing chamber portion 28 of the valve chamber 18.

As previously mentioned, the hollow valve member 20 includes means for further reducing fluid pressure in an acoustically damping manner upstream of the fluid outlet 16. Specifically, the further pressure reducing means comprises a porous insert 32 in the hollow valve member 20 adapted to damp noise upstream of the fluid outlet 16, and the porous insert 32 is disposed intermediate the openings in the valve member 20, i.e., the openings 22 and 24, such that fluid from the incremental pressure reducing means (as described in detail hereinafter) passes through the porous insert 32 before reaching the fluid outlet 16. In addition, the flow control valve 10 includes means for controlling pressure at the fluid outlet 16 by controlling the position of the valve member 20.

With regard to controlling the position of the valve member 20, means are provided for biasing the valve member 20 in a direction away from the fluid outlet 16. The biasing means preferably comprises a coil spring 34 disposed between an annular surface 36 surrounding the porous insert 32 and facing the outlet chamber portion 18b, on the one hand, and the end 18b of the valve chamber 18 adjacent the fluid outlet 16, on the other hand. Additionally, the biasing means includes fluid pressure in the outlet chamber portion 26 of the valve chamber 18.

Balancing the biasing force of the coil spring 34 and the fluid pressure in the outlet chamber portion 26 is a pressure signal conveyed to the pressure sensing chamber portion 28 to act on a solid valve surface 38. The solid valve surface 38 of the hollow valve member 20 faces the pressure sensing chamber portion 28, and the pressure signal conveyed by the pressure sensing line 30 through a pressure control device 40 to the pressure sensing chamber portion 28 acts on the solid valve surface 38 in opposition to the biasing means, i.e., the coil spring 34 and the fluid pressure in the outlet chamber portion 26 of the valve chamber 18. In this manner, pressure at the fluid outlet 16 can be accurately controlled.

As previously mentioned, the flow control valve 10 includes means for reducing fluid pressure in an incremental manner. The incremental pressure reducing means includes a plurality of stacked orifice plates 42 in a pressure reduction chamber 44 to provide a preselected drop in fluid pressure between the fluid inlet 14 and the valve chamber 18. As shown in FIG. 1, the pressure reduction chamber 44 forms a portion of a fluid passageway generally designated 46 upstream of the valve chamber 18.

As will be appreciated, the stacked orifice plates 42 are selected to provide a preselected drop in fluid pressure between the fluid inlet 14 and the valve chamber 18. It is also advantageous to provide a second fluid passageway generally designated 48 which has a second pressure reduction chamber 50 upstream of the valve chamber 18 where the second pressure reduction chamber 50 also includes a plurality of stacked orifice plates 42 selected to provide a second preselected drop in fluid pressure between the fluid inlet 14 and the valve chamber 18. With this arrangement, the hollow valve member 20 is formed such that the opening 22 is adapted for communication with one or both of the pressure reduction chambers 44 and 50 to receive fluid from the fluid inlet 14 only after an incremental reduction of pressure by the stacked orifice plates 42.

As shown in FIG. 1, the hollow valve member 20 is such that the upstream opening 22 is in communication with the fluid inlet 14 through the pressure reduction chambers 44 and 50 and the downstream opening 24 is in communication with the fluid outlet 16 through the outlet chamber portion 26 of the valve chamber 18. As a result, a fluid flow path is defined through the porous insert 32 in the hollow valve member 20 for acoustically damping noise in the valve 10 and the upstream opening 22 in the hollow valve member 20 is adapted to be placed in communication with one or both of the pressure reduction chambers 44 and 50.

Accordingly, the hollow valve member 20 is in communication with one or both of the pressure reduction chambers 44 and 50 to receive fluid from the fluid inlet 14 after an incremental reduction of pressure by the stacked orifice plates 42. Fluid from the pressure reduction chambers 44 and 50 then passes through the porous insert 32 before reaching the fluid outlet 16 by means of which noise is acoustically damped upstream of the fluid outlet 16. Moreover, the flow control valve 10 can be provided with a preselected number of the stacked orifice plates 42 in each of the pressure reduction chambers 44 and 50 to control the operating characteristics thereof.

With this construction, the pressure controlling means is adapted to position the upstream opening 22 in the hollow valve member 20 for communication with one or both of the pressure reduction chambers 44 and 50. As previously mentioned, the porous insert 32 is disposed intermediate the upstream and downstream openings 22 and 24 in the hollow valve member 20 such that all fluid from the pressure reduction chambers 44 and 50 must pass through the porous insert 32 before reaching the fluid outlet 16. Moreover, the hollow valve member 20 preferably includes a generally annular wall 52 extending from the solid valve surface 38 toward the fluid outlet 16.

As shown in FIG. 1, the generally annular wall 52 defines an insert receiving cavity 54 with the porous insert 32 being disposed within the insert receiving cavity 54. The generally annular wall 52 includes an internal radial offset adjacent the end of the porous insert 32 facing the fluid outlet 16 to define the annular surface 36 surrounding the porous insert 32. Additionally, the generally annular wall 52 includes an external radial undercut 56 communicating with the upstream opening 22 adjacent the end of the porous insert 32 opposite the fluid outlet 16.

With this arrangement, the pressure reduction chambers 44 and 50 are adapted to communicate with the upstream opening 22 through the radial undercut 56 in the generally annular wall 52 of the hollow valve member 20. It will also be seen that the valve chamber 18 is provided with a smooth, generally cylindrical axially extending insert 58 adapted to carry the hollow valve member 20 for longitudinally reciprocating movement therewithin. As shown, the insert 58 has openings 60, 62, 64 and 66 accommodating communication of the valve chamber 18 with the pressure reduction chambers 44 and 50 and the pressure sensing line 30. It will be seen that the openings 60 and 62 accommodate selective communication of one or both of the pressure reduction chambers 44 and 50 with the external radial undercut 56 in the generally annular wall 52 of the hollow valve member 20. Moreover, as shown, the insert 58 in the valve chamber 18 accommodates communication of the external radial undercut 56 with the pressure control device 40 through the opening 64 and communication of the pressure control device 40 with the pressure sensing chamber portion 18a of the valve chamber 18 through the opening 66.

In the embodiment illustrated in FIG. 1, the presure reduction chambers 44 and 50 are disposed generally transversely of the valve chamber 18. It will also be seen that a single expansion chamber 68 is provided on the upstream side of the pressure reduction chambers 44 and 50 and an expansion chamber 70 and 72 is provided downstream of each of the pressure reduction chambers 44 and 50, respectively, adjacent the openings 60 and 62, respectively, in the insert 58 in the valve chamber 18. With this arrangement, the expansion chambers 68, 70 and 72 accommodate full flow through the flow control valve 10.

Referring to FIG. 2, the stacked orifice plates 42 can be formed to include a ring portion 42a and a separate solid disk portion 42b having an orifice 42c therethrough. It is then possible to stack a plurality of the orifice plates 42 in the manner shown in FIG. 1 so that the orifices 42c are offset relative to one another. In addition, the stacked orifice plates 42 can be maintained within the pressure reduction chambers 44 and 50 by means of retaining clips 74.

Referring to FIG. 3, an alternative embodiment of stacked orifice plates 42' is illustrated. The stacked orifice plates in this embodiment include a ring portion 42a' together with an integral disk 42b' having an orifice 42c' therein. Again, the stacked orifice plates 42C' can be assembled in an manner in which the orifices 42c' are offset relative to one another.

As will be apreciated, the stacked orifice plates 42 or 42' eliminate choked flow by reducing the pressure drop across each orifice 42c or 42c'. Since the velocity of fluid flow is slower and the drop in fluid pressure is reduced, noise from fluid flow is reduced.

Referring once again to FIG. 1, the pressure sensing line 30 preferably includes a restriction as at 76. The restriction can be formed so as to accomplish a selected pressure drop across it which will determine the rate at which the valve will open and shut, e.g., without a restriction the valve will rapidly open and shut whereas with a very narrow restriction as at 76 the valve will open and shut very slowly. After fluid passes through the control devie 40, the fluid is carried to the fluid outlet 16 by means of a return line 78, as shown in FIG. 1.

The porous insert 32 is preferably formed of sintered powdered metal to provide for a longer, more tortuous flow path which also reduces the flow velocity and pressure in a quiet manner. Moreover, since the porous insert 32 is immediately downstream of the stacked orifice plates 42 or 42', it will tend to dampen any acoustic noise generated by the stacked orifice plates 42 or 42'.

The variable gain is achieved by varying the number of stacked orifice plates 42 or 42' in each of the pressure reduction chambers 44 and 50 and by increasing or decreasing the diameter of each orifice 42c or 42c'. Moreover, control is provided by varying the pressure on the solid valve surface 38 of the hollow valve member 20. In others works, the valve 10 is controlled by moving the hollow valve member 20 against the biasing force of the coil spring 34 and the fluid pressure at the fluid outlet 16 to open or close the openings 60 and 62.

When the fluid is a gas, the flow control valve 10 substantially eliminates a choked condition that is a major contributor of noise. This is accomplished by reducing incremental pressure drops while still providing the same overall pressure drop across the valve. In addition, the porous insert provides a final pressure drop which also gives a damping effect on fluid flow to modulate pressure pulses.

The porous insert can be selected to have a porosity to give a desired operating characteristic. It can be formed of metal granules such as aluminum or the like. Because of voids in the insert, the fluid follows a tortuous flow path to reach the fluid outlet 16.

As shown, the porous insert 32 can be maintained in position by a retaining clip 80. It is also possible to accomplish the same result by trapping the insert by means of the coil spring 34 cooperating with an annular ring overlapping the annular surface 36 and the porous insert 32. In either case, the porous insert 32 can be replaced by another insert to achieve different operating characteristics, if desired.

By providing the pressure reduction chambers 44 and 50 with a different number of stacked orifice plates 42 or 42', it is possible to achieve an exponentially operating valve. If a linear valve is desired, an equal number of stacked orifice plates 42 or 42' will be provided but in either case, the stacked orifice plates are suitable formed of metal.

While in the foregoing there have been set forth preferring embodiments of the invention, it is to be understood that the invention is only to be limited by the spirit and scope of the appended claims.

We claim:

1. A flow control valve, comprising:
   a valve housing having a fluid inlet and a fluid outlet;
   a valve chamber intermediate said fluid inlet and said fluid outlet, said fluid inlet communicating with said fluid outlet through said valve chamber;
   means for reducing fluid pressure in an incremental manner, said incremental pressure reduction means being disposed intermediate said fluid inlet and valve chamber;
   a hollow valve member disposed in said valve chamber for reciprocating movement and in communication with said fluid inlet through said incremental pressure reduction means, said hollow valve member including means for further reducing fluid pressure in an acoustically damping manner upstream of said fluid outlet, said hollow valve member including an upstream opening in communication with said incremental pressure reduction means and a downstream opening in communication with said fluid outlet, said hollow valve member being disposed generally intermediate opposing ends of said valve chamber, said hollow valve member dividing said valve chamber into an outlet chamber portion adjacent said fluid outlet and a pressure sensing chamber portion remote from said fluid outlet; and
   means for controlling pressure at said fluid outlet by controlling the position of said valve member, said pressure controlling means including for biasing said hollow valve member in a direction away from said fluid outlet and also including a pressure sensing line having one end in direct communication with said upstream opening in said hollow valve member downstream of said incremental pressure reduction means, said pressure sensing line having the other end in direct communication with said pressure sensing chamber portion of said valve chamber, said pressure sensing line being in communication with a pressure control device intermediate its ends to convey a pressure signal to said pressure sensing chamber portion to act on said hollow valve member in opposition to said biasing means.

2. The flow control valve as defined by claim 1 wherein said further pressure reduction means including a porous insert in said hollow valve member adapted to damp nosise upstream of said fluid outlet, said porous insert being disposed intermediate said openings in said valve member such that fluid from said incremental pressure reduction means passes through said porous insert before reaching said fluid outlet.

3. The flow control valve as defined by claim 1 wherein said valve chamber includes a smooth generally cylindrical axially extending insert adapted to carry said hollow valve member, said hollow valve member including a solid valve surface facing said pressure sensing chamber portion and including an annular surface surrounding said porous insert and facing said outlet chamber portion, said biasing means comprising a coil spring disposesd between said annular surface of said hollow valve member and the end of said valve chamber adjacent said fluid outlet and also comprising fluid pressure in said outlet chamber portion of said valve chamber.

4. The flow control valve as defined by claim 1 including a fluid passageway having a pressure reduction chamber upstream of said valve chamber, said pressure reduction chamber including a plurality of stacked orifice plates selected to provide a preselected drop in fluid pressure between said fluid inlet and said valve chamber, said stacked orifice plates comprising said incremental pressure reduction means.

5. The flow control valve as defined by claim 4 including a second fluid passageway having a second pressure reduction chamber upstream of said valve chamber, said second pressure reduction chamber including a plurality of stacked orifice plates selected to provide a second preselected drop in fluid pressure between said fluid inlet and said valve chamber, said stacked orifice plates comprising said incremental pressure reduction means.

6. The flow control valve as defined by claim 5 wherein said hollow valve member has an opening adapted for communication with one or both of said pressure reduction chambers, said opening receiving fluid from said fluid inlet after incremental reduction of the pressure thereof by said stacked orifice plates, said pressure controlling means being adapted to position said opening in said hollow valve member in communication with one or both of said pressure reduction chambers.

7. A valve for controlling fluid flow in a manner reducing noise, comprising:
   a valve housing having a fluid inlet and a fluid outlet;
   a valve chamber intermediate said fluid inlet and said fluid outlet, said fluid inlet communicating with said fluid outlet through said valve chamber;
   a fluid passageway including a pressure reduction chamber upstream of said valve chamber, said pressure reduction chamber including a plurality of stacked orifice plates, said stacked orifice plates being adapted to incrementally reduce pressure of fluid from said fluid inlet;

a hollow valve member in said valve chamber for reciprocating movement therewithin, said hollow valve member being in communication with said pressure reduction chamber to receive fluid from said fluid inlet after incremental reduction of the pressure thereof by said stacked orifice plates, said hollow valve member including means for further reducing fluid pressure upstream of said fluid outlet, said hollow valve member including an upstream opening in communication with said pressure reduction chamber and a downstream opening in communication with said fluid outlet, said hollow valve member being disposed generally intermediate opposing ends of said valve chamber, said hollow valve member dividing said valve chamber into an outlet chamber portion adjacent said fluid outlet and a pressure sensing chamber portion remote from said fluid outlet;

said further pressure reduction means including a porous insert disposed within said hollow valve member, fluid from said pressure reduction chamber passing through said porous insert before reaching said fluid outlet, said porous insert being adapted for acoustically damping noise upstream of said fluid outlet, said porous insert being disposed intermediate said openings in said valve member such that fluid from said pressure reduction chamber passes through said porous insert before reaching said fluid outlet; and means for controlling pressure at said fluid outlet by controlling the position of said valve member, said pressure controlling means including means for biasing said hollow valve member in a direction away from said fluid outlet and including a pressure sensing line having one end in direct communication with said upstream opening in said hollow valve member downstream of said pressure reduction chamber, said pressure sensing line having the other end in direct communication with said pressure sensing chamber portion of said valve chamber, said pressure sensing line being in communication with a pressure control device intermediate its ends to convey a pressure signal to said pressure sensing chamber portion to act on said hollow valve member in opposition to said biasing means.

8. The flow control valve as defined by claim 7 wherein said valve chamber includes a smooth generally cylindrical axially extending insert adapted to carry said hollow valve member, said hollow valve member including a solid valve surface facing said pressure sensing chamber portion and including an annular surface surrounding said porous insert and facing said outlet chamber portion, said biasing means comprising a coil spring disposed between said annular surface of said hollow valve member and the end of said valve chamber adjacent said fluid outlet and also comprising said fluid pressure in said outlet chamber portion of said valve chamber.

9. A variable gain valve for controlling fluid flow in a manner reducing noise, comprising:

a valve housing having a fluid inlet and a fluid outlet;
a valve chamber intermediate said fluid inlet and said fluid outlet, said fluid inlet communicating with said fluid outlet through said valve chamber;

a fluid passageway including a pair of pressure reduction chambers upstream of said valve chamber, each of said pressure reduction chambers including a plurality of stacked orifice plates, said stacked orifice plates being adapted to incrementally reduce pressure of fluid from said fluid inlet;

a hollow valve member in said valve chamber for reciprocating movement therewithin, said hollow valve member having an upstream opening adapted for communication with said pressure reduction chambers to receive fluid from said fluid inlet after incremental reduction of the pressure thereof by said stacked orifice plates, said hollow value member including means for further reducing fluid pressure upstream of said fluid outlet, said hollow valve member including a downstream openig in communication with said fluid outlet, said hollow valve member being disposed generally intermediate opposing ends of said valve chamber, said hollow valve member dividing said valve chamber into an outlet chamber portion adjacent said fluid outlet and a pressure sensing chamber portion remote from said fluid outlet;

said further pressure reduction means including a porous insert disposed within said hollow valve member, fluid from said pressure reduction chambers passing through said porous insert before reaching said fluid outlet, said porous insert being adapted for acoustically damping noise upstream of said fluid outlet, said porous insert being disposed intermediate said openings in said valve member such that fluid from said pressure reduction chambers passes through said porous insert before reaching said fluid outlet; and means for controlling pressure at said fluid outlet by controlling the position of said valve member, said pressure controlling means being adapted to position said opening in said hollow valve member for communication with one or both of said pressure reduction chambers, each of said pressure reduction chambers having a preselected number of said stacked orifice plates, said pressure controlling means including means for biasing said hollow valve member in a direction away from said fluid outlet and a pressure sensing line having one end in direct communication with said upstream opening in said hollow valve member downstream of said pressure reduction chambers, said pressure sensing line having the other end in direct communication with said pressure sensing chamber portion of said valve chamber, said pressure sensing line being in communication with a pressure control device intermediate its ends to convey a pressure signal to said pressure sensing chamber portion to act on said hollow valve member in opposition to said biasing means.

10. The variable gain valve as defined by claim 9 wherein said valve chamber includes a smooth generally cylindrical axially extending insert adapted to carry said hollow valve member, said hollow valve member including a solid valve surface facing said pressure sensing chamber portion and including an annular surface surrounding said porous insert and facing said outlet chamber portion, said biasing means comprising a coil spring disposed between said annular surface of said hollow valve member and the end of said valve chamber adjacent said fluid outlet and also comprising said fluid pressure in said outlet chamber portion of said valve chamber.

11. The variable gain valve as defined by claim 10 wherein said hollow valve member includes a generally annular wall extending from said solid valve surface toward said fluid outlet, said generally annular wall defining an insert receiving cavity with said porous insert being disposed within said cavity, said generally annular wall including an internal radial offset adjacent the end of said porous insert facing said fluid outlet to define said annular surface surrounding said porous insert, said generally annular wall including an external radial undercut communicating with said upstream opening in said hollow valve member adjacent the end of said porous insert opposite said fluid outlet, said pressure reduction chambers being adapted to communicate with said upstream opening through said radial undercut in said generally annular wall of said hollow valve member.

12. The variable gain valve as defined by claim 11 wherein said insert in said valve chamber has openings accommodating communication of said valve chamber with said pressure reduction chambers and said pressure sensing line, said openings being positioned to accommodate selective communication of one or both of said pressure reduction chambers with said external radial undercut in said generally annular wall of said hollow valve member and to accommodate communication of said external radial undercut with said pressure sensing line, said insert in said valve chamber also having an opening accommodating communication of said pressure control device with said pressure sensing chamber portion of said valve chamber.

13. The variable gain valve as defined by claim 12 wherein said pressure reduction chambers are disposed generally transversely of said valve chamber, and including a single expansion chamber on the upstream side of said pressure reduction chambers and an expansion chamber downstream of each of said pressure reduction chambers adjacent said openings in said insert in said valve chamber, said expansion chambers accommodating full flow through said valve.

* * * * *

Disclaimer 4,739,795.—*Michael E. Ewbank; Steven A. Heitz*, both of Rockford, Ill. FLOW CONTROL VALVE. Patent dated Apr. 26, 1988. Disclaimer filed Nov. 6, 1989, by the assignee, Sundstrand Corporation.

The term of this patent subsequent to July 6, 1989, has been disclaimed
[ *Official Gazette January 30, 1990* ]